United States Patent
Liu et al.

(10) Patent No.: US 7,519,217 B2
(45) Date of Patent: Apr. 14, 2009

(54) METHOD AND SYSTEM FOR GENERATING A CLASSIFIER USING INTER-SAMPLE RELATIONSHIPS

(75) Inventors: Tie-Yan Liu, Beijing (CN); Zhike Kong, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 10/997,073

(22) Filed: Nov. 23, 2004

(65) Prior Publication Data

US 2006/0110028 A1    May 25, 2006

(51) Int. Cl.
*G06K 9/62* (2006.01)
*G06K 9/68* (2006.01)
(52) U.S. Cl. .................. 382/159; 382/155; 382/224; 382/227; 375/E7.192
(58) Field of Classification Search .............. 382/155, 382/159, 224, 227; 348/700; 375/E7.192; 706/46, 48
See application file for complete search history.

(56) References Cited

U.S. PATENT DOCUMENTS

| | | | | |
|---|---|---|---|---|
| 5,987,210 | A * | 11/1999 | Iggulden et al. | 386/46 |
| 6,285,818 | B1 * | 9/2001 | Suito et al. | 386/46 |
| 6,801,895 | B1 * | 10/2004 | Huang et al. | 704/270 |
| 6,892,193 | B2 * | 5/2005 | Bolle et al. | 706/20 |
| 2004/0161154 | A1 * | 8/2004 | Hua et al. | 382/229 |

OTHER PUBLICATIONS

Freund, Yoav, and Robert E. Schapire. "A Short Introduction to Boosting." Journal of Japanese Society of Artificial Intelligence 14(1999): 771-780.*
Tie-Yan, Liu, Tao Qin, and Hong-Jiang Zhang. "Time-Constraint Boost For TV Commercials Detection." International Conference on Image Processing (2004): 1617-1620.*
Agnihotri, Lalitha et al., "Evolvable Visual Commercial Detector," Proceedings of the 2003 IEEE Computer Society Conference on Computer Vision and Pattern Recognition, © 2003 IEEE, 6 pages.
Colombo, Carlo, Alberto Del Bimbo and Pietro Pala, "Retrieval of Commercials by Semantic Content: The Semiotic Perspective," Multimedia Tools and Applications, vol. 13, 2001, © 2001 Kluwer Academic Publishers, pp. 93-118.

(Continued)

*Primary Examiner*—Matthew C Bella
*Assistant Examiner*—Michael A Newman
(74) *Attorney, Agent, or Firm*—Perkins Coie LLP

(57) ABSTRACT

A method and system for generating a classifier to classify sub-objects of an object based on a relationship between sub-objects is provided. The classification system provides training sub-objects along with the actual classification of each training sub-object. The classification system may iteratively train sub-classifiers based on feature vectors representing the features of each sub-object, the actual classification of the sub-object, and a weight associated with the sub-object. After a sub-classifier is trained, the classification system classifies the training sub-objects using the trained sub-classifier. The classification system then adjusts the classifications based on relationships between training sub-objects. The classification system assigns a weight for the sub-classifier and weight for each sub-object based on the accuracy of the adjusted classifications.

30 Claims, 7 Drawing Sheets

OTHER PUBLICATIONS

Freund, Yoav and Robert E. Schapire, "A decision-theoretic generalization of on-line learning and an application to boosting," Sep. 20, 1995, Journal of Computer and System Sciences, vol. 55, No. 1, Aug. 1997, pp. 119-139.

Freund, Yoav and Robert E. Schapire, "A Short Introduction to Boosting," Journal of Japanese Society for Artificial Intelligence, vol. 14, No. 5, Sep. 1999, pp. 771-780.

Hauptmann, Alexander G. and Michael J. Witbrock, "Story Segmentation and Detection of Commercials In Broadcast News Video," Advances in Digital Libraries 1998, pp. 168-179.

Lienhart, Rainer, Christoph Kuhmunch and Wolfgang Effelsberg, "On the Detection and Recognition of Television Commercials," International Conference on Multimedia Computing and Systems, 1997, pp. 1-17.

Lourens, JG, "Detection and Logging Advertisements using its Sound," IEEE Transactions on Broadcasting, vol. 36, No. 3, Sep. 1990, © 1990 IEEE, pp. 231-233.

Sanchez, Juan Maria and Xavier Binefa, "AudiCom: a Video Analysis System for Auditing Commercial Broadcasts," IEEE International Conference on Multimedia Computing and Systems, vol. 2, Jun. 1999, pp. 272-276.

Vapnik, Vladimir N., "Ch. 10 The Support Vector Method for Estimating Indicator Functions," Statistical Learning Theory, © 1998 by John Wiley & Sons, Inc., pp. 401-441.

* cited by examiner

METHOD AND SYSTEM FOR GENERATING A CLASSIFIER USING INTER-SAMPLE RELATIONSHIPS

TECHNICAL FIELD

The described technology relates generally to classifying sub-objects of an object, such as classifying scenes within a video as being a commercial scene.

BACKGROUND

Information processing systems are often used to automatically classify various sub-objects of an object. For example, an image may be analyzed to classify various portions of the image as being a region of interest to a user. A portion containing a person's face may be a region of interest, whereas a portion containing background scenery may not be a region of interest. As another example, the video content of a television broadcast may be analyzed to detect the commercials. The detection of commercials in video content is particularly important because it provides high-level program segmentation so that other algorithms can be applied directly to the program content, rather than to the commercial content. For example, after commercials are detected, the commercials can be skipped when playing back a previously recorded video.

Many techniques have been proposed for detecting commercials. One technique generates signatures representing the audio of known commercials and then compares those signatures to the audio of a television broadcast. This technique, however, requires that the commercial be known in advance. Another technique is based in part on the detection of black frames that are used as separators between commercials and programs. The presence of black frames, however, may not be sufficient by itself to indicate a separation between a commercial and a program because commercials and programs may have black frames within their content. Many techniques, upon detecting a black frame, factor in other features of the scene or nearby scenes to help determine whether the scene is a commercial or a program. These features may include rate of scene changes, edge change ratios, motion vector length, frame luminance, letterbox and key frame distances, and so on.

There are, however, several difficulties with these proposed techniques for detecting commercials. One difficulty with the use of black frames for commercial detection is that the television broadcasts in many countries (e.g., Asian countries) do not use black frames to separate commercials and programs. Thus, techniques that rely primarily on black frame detection could not reliably detect commercials for such television broadcasts. Another difficulty is that the program content of many videos tends to look like commercial content, and vice versa, which makes reliable detection of commercials difficult. It would be desirable to have a technique that would more accurately detect commercials within a video.

SUMMARY

A method and system for generating a classifier to classify sub-objects of an object based on a relationship between the sub-objects is provided. The classification system provides training sub-objects along with the actual classification of each training sub-object. The classification system may iteratively train sub-classifiers based on feature vectors representing the features of each sub-object, the actual classification of the sub-object, and a weight associated with the sub-object. After a sub-classifier is trained, the classification system classifies the training sub-objects using the trained sub-classifier. The classification system then adjusts the classifications based on relationships between training sub-objects. The classification system then determines the accuracy of the trained sub-classifier by comparing the adjusted classifications to the actual classifications. The classification system assigns a weight for the sub-classifier that reflects its accuracy for use when combining the classifications of all the sub-classifiers. The classification system also generates a weight for each training sub-object to be used when training the next sub-classifier according to the accuracy of the adjusted classifications. After the sub-classifiers are trained, the classification system can use the sub-classifiers to classify sub-objects of an object. To classify the sub-objects, the classification system applies each sub-classifier to the sub-objects to generate a classification for each sub-object for each sub-classifier. The classification system then adjusts the classifications for each sub-classifier based on relationships between the sub-objects. The classification system then generates a combined classification for each sub-object based on the adjusted classification of each sub-classifier and the weight assigned to that sub-classifier during training.

DETAILED DESCRIPTION

Figure 1:
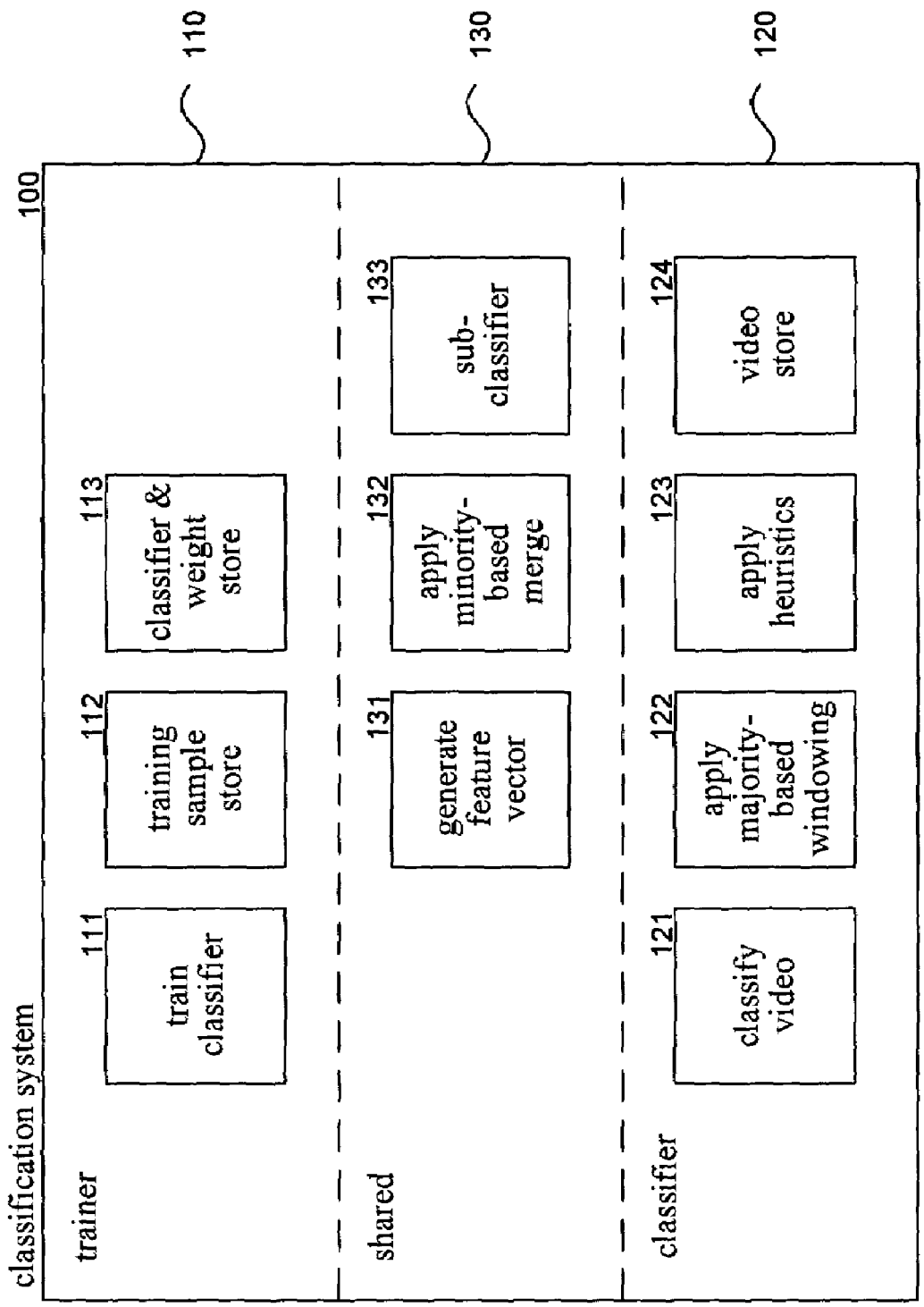
FIG. 1 is a block diagram that illustrates components of the classification system in one embodiment.

A method and system for generating a classifier to classify sub-objects of an object based on a relationship (or dependency) between sub-objects is provided. Conventional classifiers are trained based on an assumption that the training sub-objects are independent of one another. In one embodiment, the classification system provides training samples (i.e., training sub-objects) along with the actual classification of each training sample. For example, the training samples may be scenes of video content that are classified as commercial or program. The classification system may iteratively train sub-classifiers based on feature vectors representing the features of each scene, the actual classification of the scene, and a weight associated with the scene. In the case of video scenes, the features may be derived from analysis of the audio content and video content of the scene. After a sub-classifier is trained using training techniques that may be conventional, the classification system classifies the training samples using the trained sub-classifier. The classification system then adjusts the classifications based on relationships between training samples. For example, if a sequence of scenes is seconds long, and the first and last scenes are both classified as commercials, the classification system may adjust the classifications of all the other scenes within the sequence to also be commercial. In this example, the classification system factors in the time relationships or dependencies between the scenes. The classification system then determines the accuracy of the trained sub-classifier by comparing the adjusted classifications to the actual classifications. The classification system assigns a weight for the sub-classifier that reflects its accuracy for use when combining the classifications of all the sub-classifiers. The classification system also generates a weight for each training sample to be used when training the next sub-classifier. The classification system weights training samples according to the accuracy of the adjusted classifications. In particular, the weights for training samples whose adjusted classifications are not particularly accurate are higher than those whose adjusted classifications are accurate. This weighting of the training samples allows the next sub-classifier to emphasize the accuracy of those training samples whose adjusted classifications are not particularly accurate. In one embodiment, the classifier is an "adaptive boosting" classifier. The classification system may generate a predefined number of sub-classifiers or continue generating sub-classifiers until a certain accuracy threshold is met.

After the sub-classifiers are trained, the classification system can use the sub-classifiers to classify sub-objects of an object. For example, the classification system may classify the scenes of a television broadcast as commercial or program. To classify the sub-objects, the classification system applies each sub-classifier to the sub-objects to generate a classification for each sub-object for each sub-classifier. The classification system then adjusts the classifications for each sub-classifier based on relationships between the sub-objects. For example, as described above, the classification system may adjust the classification of scenes that are bounded by scenes classified as commercials. The classification system then generates a combined classification for each sub-object based on the adjusted classification of each sub-classifier and the weight assigned to that sub-classifier during training. In one embodiment, the classification system may again adjust the classifications of the sub-objects based on relationships between the sub-objects. For example, if a sequence of scenes has a mix of classifications, the classification system may set the classification of all the scenes within the sequence to the classification of the majority of the scenes. The classification system may also adjust the classifications of the sub-objects based on various heuristics. For example, if a short scene (or short sequence of scenes) that is classified as commercial is surrounded by scenes that are classified as program, the classification system may reclassify the short scene as program on the assumption that the length of the scenes does not meet the minimum length of a commercial. In this way, the classification system can factor in relationships (e.g., timing) between sub-objects when classifying the sub-objects of an object.

In one embodiment, the classification system generates a classifier for detection of commercials within a video. To generate the classifier, the classification system first segments a training video into scenes and extracts a feature vector $x_i$ and inputs the actual classification $y_i$ for each scene. The training data is thus $(x_1, y_1), \ldots, (x_N, y_N)$ for N scenes. The feature vectors may include start time, average luminance, average audio volume, and so on of the scenes. The classification system initializes the weight for each training scene according to the following equation:

$$D_1(i) = 1/N \tag{1}$$

where D is the weight for the i-th training scene for the first sub-classifier and N is the number of training scenes. The classification system thus starts out giving each training scene an equal weight. The classification system then generates each sub-classifier $g_t$ where $t=1, \ldots, T$ and T is the number of sub-classifiers. The sub-classifier $g_t$ maps a feature vector to a commercial or a program classification, which may be represented by a +1 or −1 value. After a sub-classifier is trained, the classification system may apply a minority-based merge technique to the sequence $\{g_t(x_i)\}$ to generate an adjusted classification $h_t$. The minority-based merge technique identifies a sequence of scenes such that the timing of the scenes and their classifications appear to indicate that they should be classified as commercials. For example, if a 60-second sequence of scenes has 10 six-second scenes and the first scene, a middle scene, and the last scene are each classified as commercial, then a minority-based merge technique may change the classification of the other scenes to commercial, even though only a minority of the scenes are classified as commercial. One skilled in the art would appreciate that many different techniques may be used to adjust the classifications of the scene based on inter-scene dependencies. For example, the classification system may use the audio volume between adjacent scenes as an indication of a change from commercial to program or vice versa. The classification system calculates the accuracy or error rate of the sub-classifier by the following equation:

$$\varepsilon_t = \sum_{h_t(x_i) \neq y_i} D_t(i) \tag{2}$$

where $\varepsilon_t$ is the error rate of the t-th sub-classifier. Thus, the error rate is the sum of the weights of those training scenes whose classification was in error. The classification system then calculates the weight to assign to the sub-classifier by the following equations:

$$\alpha_t = \frac{1}{2} \ln\left(\frac{1-\varepsilon_t}{\varepsilon_t}\right) \tag{3}$$

where $\alpha_t$ is the weight of the t-th sub-classifier. The classification system calculates the weight of the training scenes by the following equation:

$$D_{t+1}(i) = \frac{D_t(i)}{Z_t} \times \begin{cases} e^{-\alpha_t}, & \text{if } h_t(x_i) = y_i \\ e^{\alpha_t}, & \text{if } h_t(x_i) \neq y_i \end{cases} \tag{4}$$

where $Z_t$ is a normalization factor. One skilled in the art will appreciate that these equations may be varied to effect the use of different error and weighting algorithms.

After the classification system trains the sub-classifiers and assigns their weights, the sub-classifiers can be used to classify portions of a video. To classify the portions of the video, the classification system segments the video into scenes and extracts a feature vector $x_i$ for each scene. The classification system then uses each sub-classifier $g_t$ to generate a classification $g_t(x_i)$ for each scene i for each sub-classifier t. The classification system then applies a minority-based merge technique to the classifications of each sub-classifier to generate an adjusted classification $h_t(g_t(x_i))$ for each scene i for each sub-classifier t. The classification system then combines the adjusted classifications of each scene to generate a combined classification for each scene based on the weights assigned to the sub-classifiers according to the following equation:

$$H(x_i) = \text{sign}\left(\sum_{t=1}^{T} \alpha_t h_t(g_t(x_i))\right) \quad (5)$$

where $H(x_i)$ is the adjusted classification for the i-th scene. The classification system may then apply a majority-based windowing technique to adjust the combined classification. The classification system may then apply various heuristics such as minimal commercial and program lengths to again adjust the combined classifications.

The algorithm described above is an adaptive boosting ("Adaboosting") algorithm. Adaptive boosting is an iterative process that runs multiple tests on a collection of training samples. Adaptive boosting transforms a weak learning algorithm (an algorithm that performs at a level only slightly better than chance) into a strong learning algorithm (an algorithm that displays a low error rate). The weak learning algorithm or classifier is run on training samples. The algorithm concentrates more and more on those training samples in which its predecessor weak learning algorithm tended to show errors. The algorithm corrects the errors made by earlier weak classifiers (i.e., sub-classifiers). The algorithm is adaptive because it adjusts to the error rates of its predecessors. Adaptive boosting combines rough and moderately inaccurate rules of thumb to create a high-performance algorithm. Adaptive boosting combines the results (i.e., sub-classifiers) of each separately run test into a single, very accurate classifier.

FIG. 1 is a block diagram that illustrates components of the classification system in one embodiment. In this embodiment, the classification system 100 classifies scenes of video as commercial or program. The classification system includes trainer components 110, classifier components 120, and shared components 130. The trainer components include a train classifier component 111, a training sample store 112, and a classifier and weight store 113. The shared components include a generate feature vector component 131, an apply minority-based merge component 132, and a sub-classifier component 133. The train classifier component controls the training of sub-classifiers based on the training samples of the training sample store. The train classifier component invokes the generate feature vector component to generate a feature vector for each training sample. The train classifier component invokes the apply minority-based merge component to adjust the classifications of the training samples generated by a trained sub-classifier. The sub-classifier component corresponds to the classifier that is being trained. The train classifier component stores the resulting classifier parameters and weights in the classifier and weight store. The classifier components include a classify video component 121, an apply majority-based windowing component 122, an apply heuristics component 123, and a video store 124. The classify video component receives a video, segments the video into scenes, extracts a feature vector for each scene, and then classifies the scenes using each trained sub-classifier. The classify video component then invokes the apply minority-based merge component for each set of classifications generated by a sub-classifier to adjust the classifications. The classify video component then generates a combined classification for each scene based on the adjusted classifications factoring the weights of the sub-classifiers. The classify video component invokes the apply majority-based windowing component to adjust the combined classifications. The classify video component may then invoke the apply heuristics component to perform a final adjustment on the combined classifications.

The computing device on which the classification system is implemented may include a central processing unit, memory, input devices (e.g., keyboard and pointing devices), output devices (e.g., display devices), and storage devices (e.g., disk drives). The memory and storage devices are computer-readable media that may contain instructions that implement the classification system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the classification system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
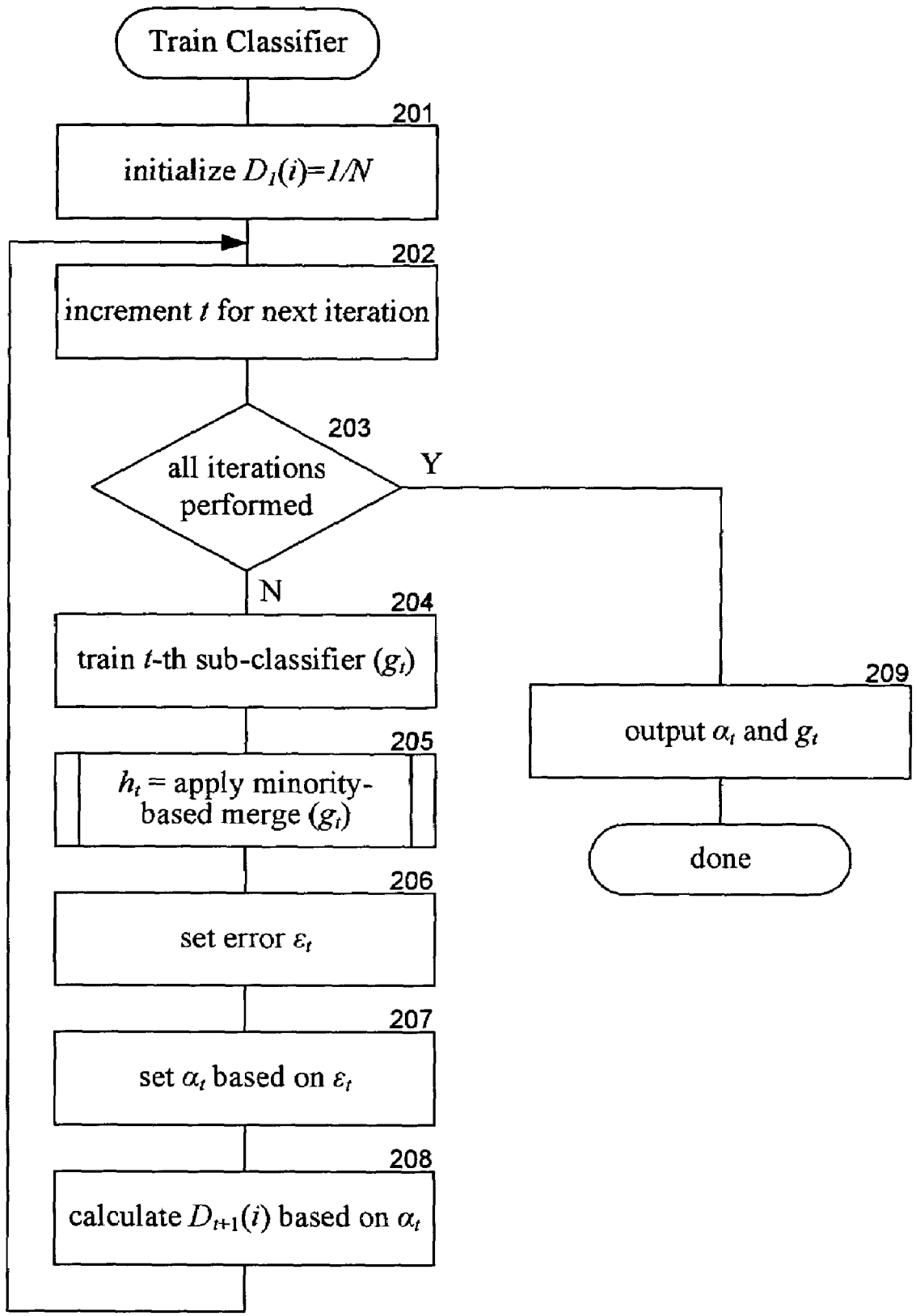
FIG. 2 is a flow diagram that illustrates the processing of the train classifier component in one embodiment.

FIG. 2 is a flow diagram that illustrates the processing of the train classifier component in one embodiment. The component is passed feature vectors for the scenes of a video along with the actual classification of each scene. In block 201, the component initializes the weights of the scenes to be equal and sum to one. In blocks 202-208, the component loops training a certain number of classifiers. In block 202, the component increments the count of iterations. In decision block 203, if all the iterations have already been performed, then the component continues at block 209, else the component continues at block 204. In block 204, the component trains the t-th sub-classifier $g_t$. One skilled in the art will appreciate that any of a variety of classification techniques may be used as a sub-classifier. In block 205, the component invokes the apply minority-based merge component to adjust the classification of the training samples generated by the trained sub-classifier based on inter-sample relationships. In block 206, the component sets the error rate of the sub-classifier. In block 207, the component calculates the weight for the sub-classifier. In block 208, the component adjusts the weights for the scenes based on the error rate of the sub-classifier. The component then loops to block 202 to select the next iteration. In block 209, the component outputs the parameters defining the sub-classifiers and weights assigned to the sub-classifiers. The component then completes.

Figure 3:
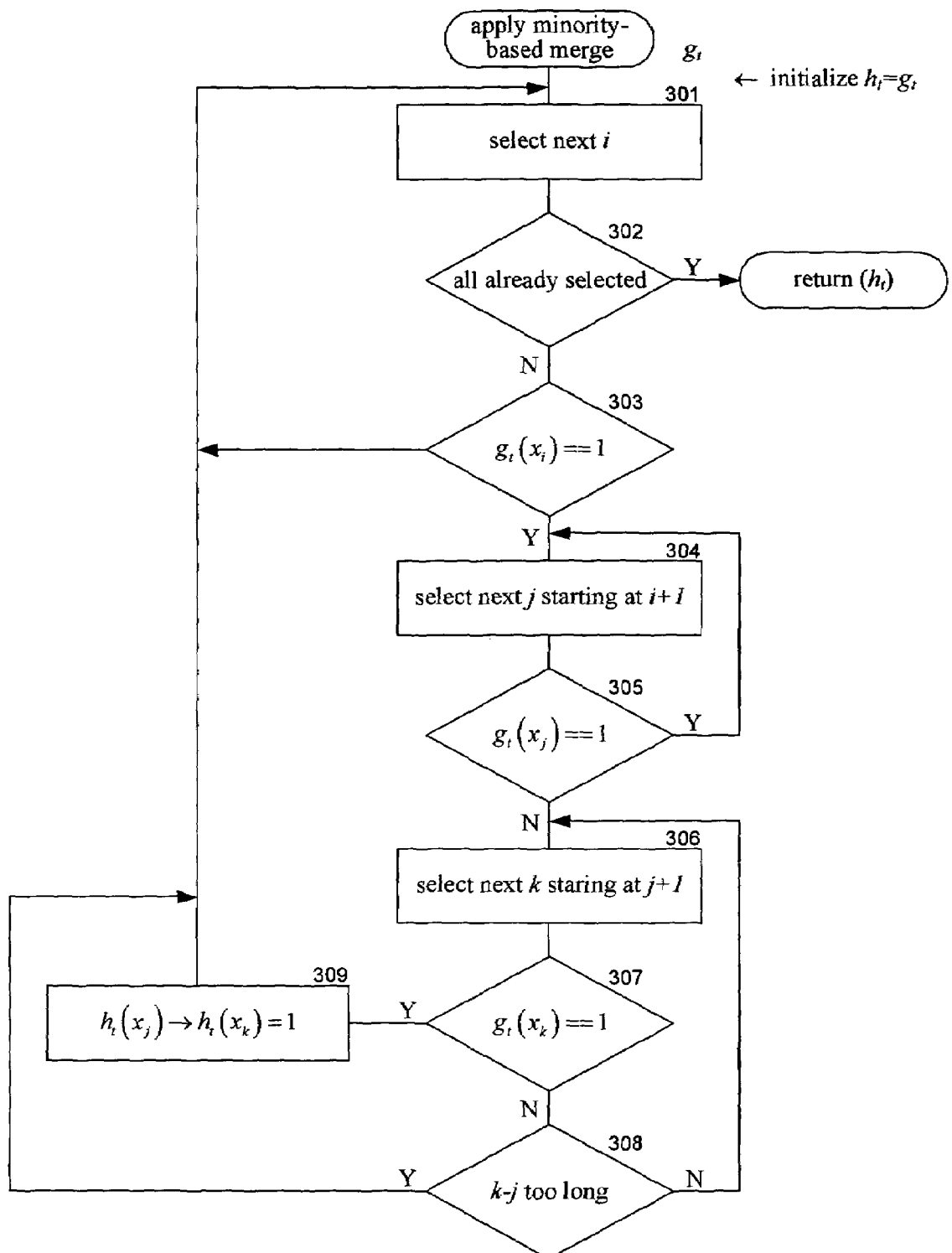
FIG. 3 is a flow diagram that illustrates the processing of the apply minority-based merge component in one embodiment.

FIG. 3 is a flow diagram that illustrates the processing of the apply minority-based merge component in one embodiment. The component is passed the classifications of the training samples generated by a sub-classifier and adjusts the classifications using a minority-based merge technique. The component may initialize the adjusted classifications to the classifications calculated by the sub-classifier. In blocks 301-309, the component loops selecting each scene and performing the minority-based merge. In block 301, the component selects the next scene. In decision block 302, if all the scenes have already been selected, then the component returns, else the component continues at block 303. In block 303, if the selected scene is commercial, then the component continues at block 304, else the component loops to block 301 to select the next scene. In blocks 304-305, the component loops searching for the next program scene, which indicates the start of a sequence of program scenes bounded by commercial scenes. In block 304, the component selects the next scene starting after the currently selected scene. In decision block 305, if the newly selected scene is still commercial, then the component loops to block 304 to select the next scene, else the component continues at block 306. In blocks 306-308, the component loops searching for the next commercial scene, which bounds the sequence of program scenes. In block 306, the component selects the next scene after the currently selected scene. In decision block 307, if the currently selected scene is commercial, then the bounding scene has been found and the component continues at block 309, else the component continues at block 308. In decision block 308, if the number of program scenes between the bounding commercial scenes is too many or their time too long, then the component loops to block 301 to select the next scene without adjusting the classifications, else the component loops to block 306 to select the next scene. In block 309, the component changes the classifications of those program scenes between the bounding commercial scenes to commercial and then loops to block 302 to select the next scene. One skilled in the art will appreciate that this is just one example of a minority-based merge technique. Moreover, one skilled in the art will appreciate that the classification can be adjusted based on comparison of a variety of different features between samples resulting in an inter-sample classification adjustment.

Figure 4:
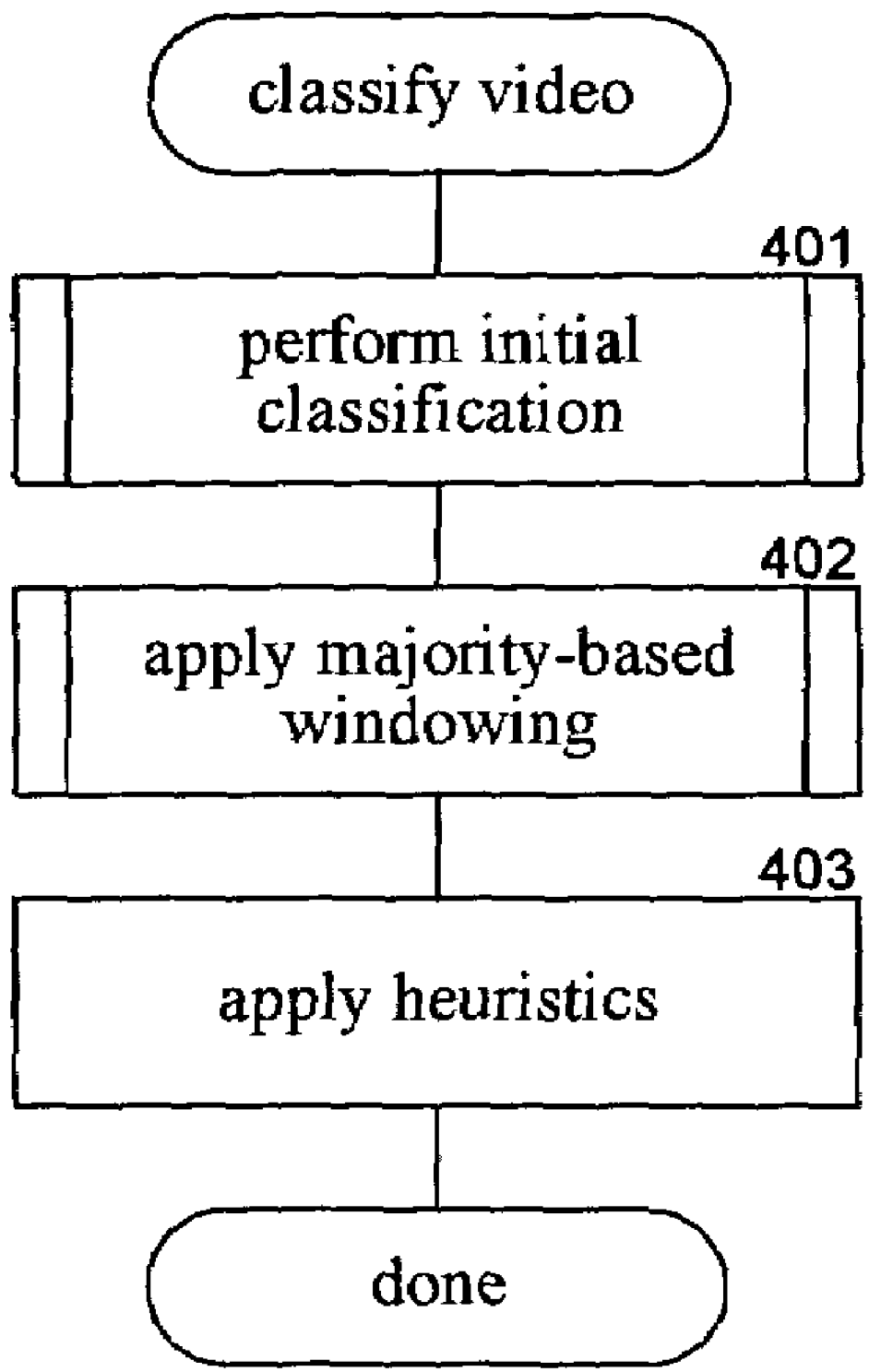
FIG. 4 is a flow diagram that illustrates the processing of the classify video component in one embodiment.

FIG. 4 is a flow diagram that illustrates the processing of the classify video component in one embodiment. In block 401, the component invokes a perform initial classification component to classify the scenes of the video based on the combined classifications of the sub-classifiers. In block 402, the component invokes the apply majority-based windowing component to adjust the combined classifications based on the classification of the majority of the scenes within various windows in the video. In block 403, the component invokes the apply heuristics component to again adjust the combined classification based on various rules of thumb and then completes.

Figure 5:
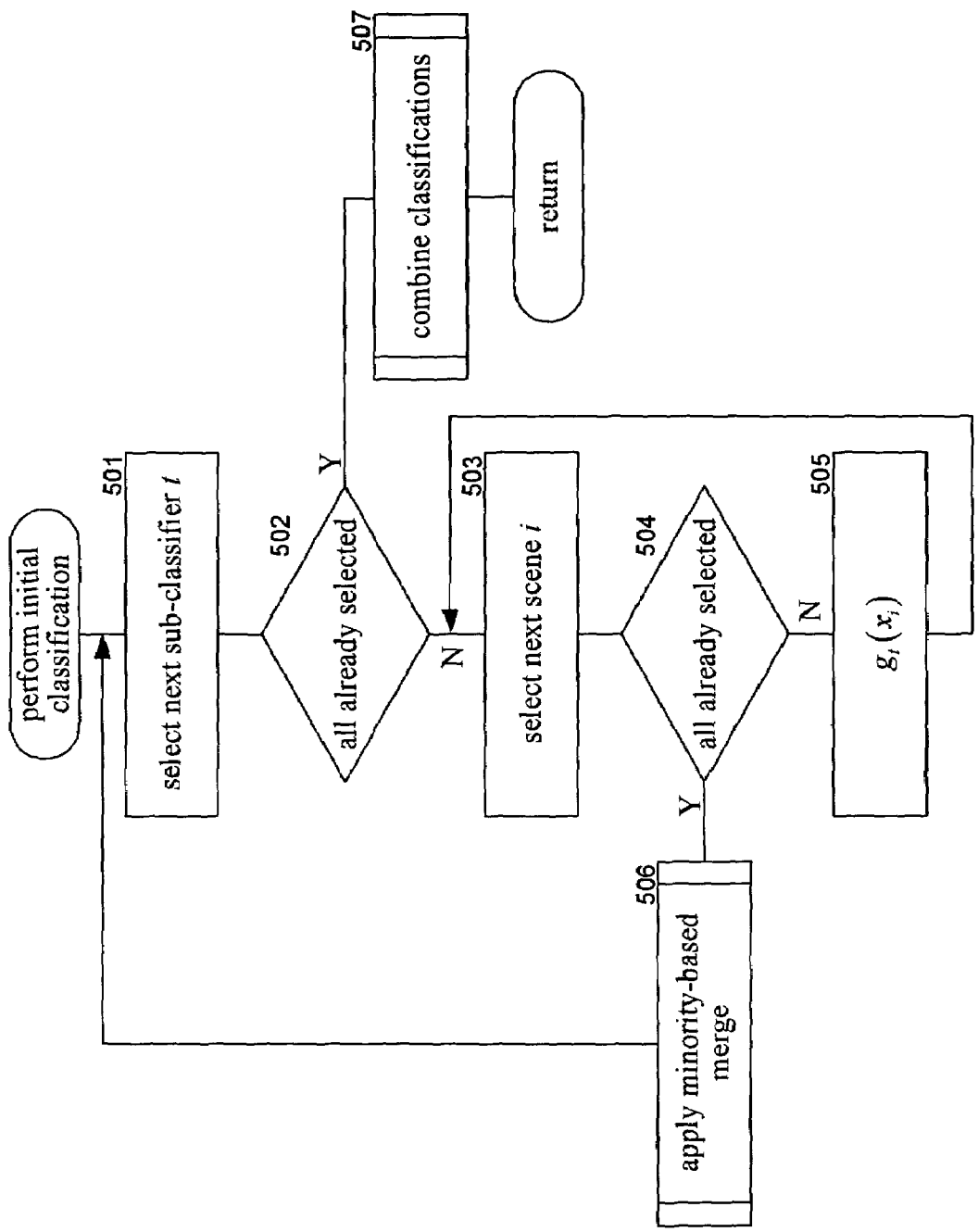
FIG. 5 is a flow diagram that illustrates the processing of the perform initial classification component in one embodiment.

FIG. 5 is a flow diagram that illustrates the processing of the perform initial classification component in one embodiment. The component classifies each scene using each sub-classifier, applies inter-scene adjustments to the classifications, and then combines the adjusted classifications for each scene into a single classification for the scene. In block 501, the component selects the next sub-classifier. In decision block 502, if all the sub-classifiers have already been selected, then the component continues at block 507, else the component continues at block 503. In blocks 503-505, the component loops classifying each scene using the selected sub-classifier. In block 503, the component selects the next scene. In decision block 504, if all the scenes have already been selected for the selected sub-classifier, then the component continues at block 506, else the component continues at block 505. In block 505, the component classifies the selected scene using the selected sub-classifier and then loops to block 503 to select the next scene. In block 506, the component invokes the apply minority-based merge component to adjust the classifications generated by the selected sub-classifier based on inter-scene relationships. The component then loops to block 501 to select the next sub-classifier. In block 507, the component invokes a combine classifications component to combine the classifications for each scene into a single classification for the scene. The component then returns.

Figure 6:
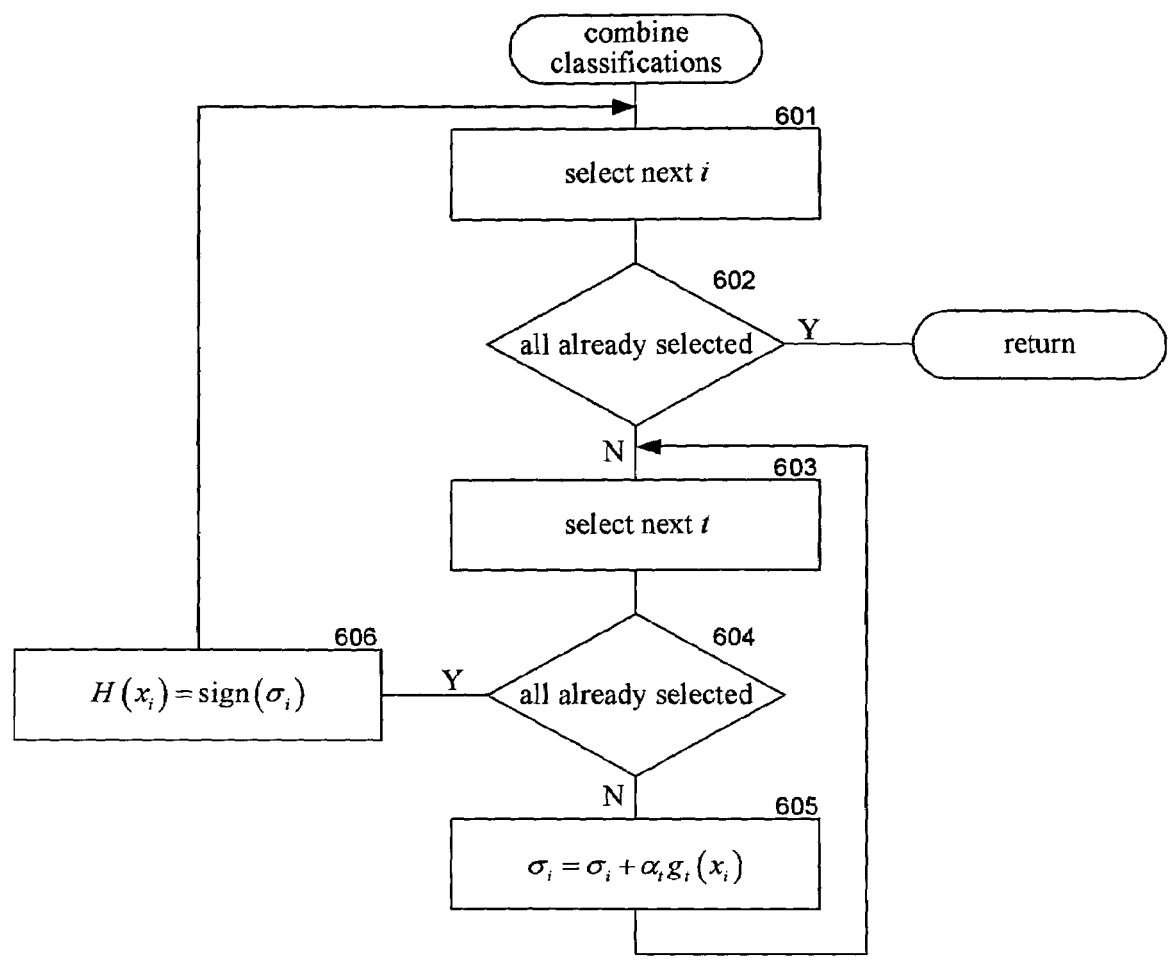
FIG. 6 is a flow diagram that illustrates the processing of the combine classification component in one embodiment.

FIG. 6 is a flow diagram that illustrates the processing of the combine classifications component in one embodiment. The component combines the classifications by generating a weighted sum of the classifications using the weights assigned to the sub-classifiers. In block 601, the component selects the next scene. In decision block 602, if all the scenes have already been selected, then the component returns, else the component continues at block 603. In blocks 603-605, the component loops calculating a combined score for the selected scene. In block 603, the component selects the next sub-classifier. In decision block 604, if all the sub-classifiers have already been selected, then the component continues at block 606, else the component continues at block 605. In block 605, the component increments the classification total for the selected scene by the weight of the selected sub-classifier times the classification of the selected scene by the selected sub-classifier. The component then loops to block 603 to select the next sub-classifier. In block 606, the component sets the combined classification to either commercial or program based on the sign of the total. For example, if a commercial classification is represented with a value of +1 and a program classification is represented with a value of −1, then the component would classify a scene with a positive total as a commercial. The component then loops to block 601 to select the next scene.

Figure 7:
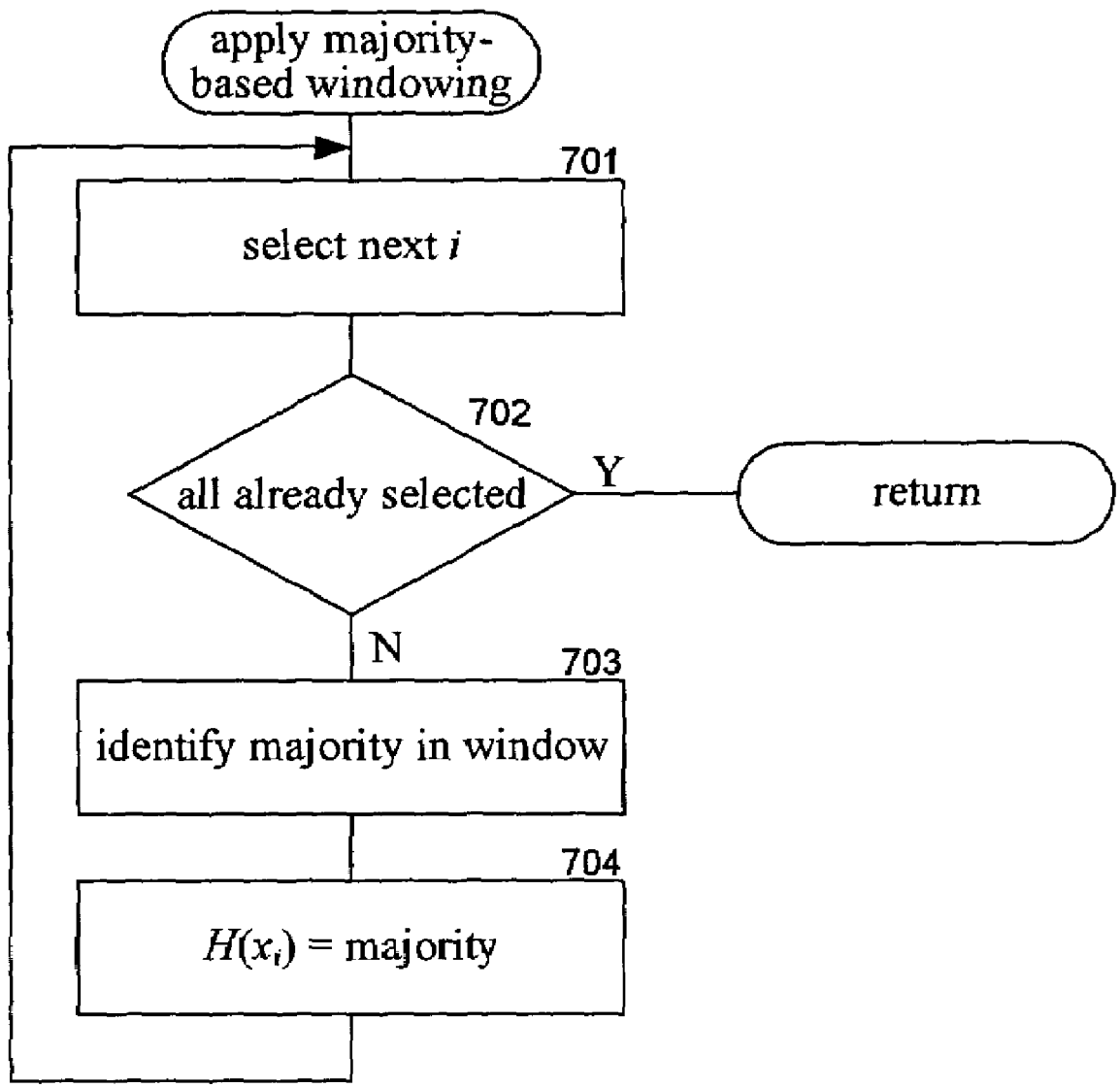
FIG. 7 is a flow diagram that illustrates the processing of the apply majority-based windowing component in one embodiment.

FIG. 7 is a flow diagram that illustrates the processing of the apply majority-based windowing component in one embodiment. The component compares the classification of a scene to a window of sequential scenes and classifies the scene based on the classification of the majority of the scenes in the window. In block 701, the component selects the next scene. In decision block 702, if all the scenes have already been selected, then the component returns, else the component continues at block 703. In block 703, the component identifies the majority of the scene classifications within the window of the selected scene. In block 704, the component sets the classification of the selected scene to the majority classification and then loops to block 701 to select the next classification. One skilled in the art will appreciate that various windowing techniques may be used. For example, the classification may be changed only when a super-majority of the scenes have the same classification.

From the foregoing, it will be appreciated that specific embodiments of the classification system have been described herein for purposes of illustration, but that various modifications may be made without deviating from the spirit and scope of the invention. Accordingly, the invention is not limited except as by the appended claims.

We claim:

1. A method in a computer system with a processor and memory for generating a classifier based on training samples factoring in inter-sample relationships, the method comprising:

providing training samples having inter-sample relationships, a training sample having a feature vector, an initial sample weight, and an actual classification;

setting a current sample weight for each training sample to the initial sample weight of the training sample; and for a plurality of iterations performed by the processor,
- selecting for this iteration a sub-classifier that has not yet been trained;
- training the selected sub-classifier based on the feature vectors, the current sample weights, and the actual classifications of the training samples;
- classifying the training samples using the trained sub-classifier such that each training sample has a classification for this iteration;
- adjusting the classifications of the training samples for this iteration based on the inter-sample relationships between the training samples;
- adjusting current sample weights for the training samples based on a difference between the classifications for this iteration as adjusted and the actual classification of the training samples such that the adjusted current sample weights are used to train the sub-classifier of the next iteration; and
- calculating a sub-classifier weight for the trained sub-classifier of this iteration based on the classifications of this iteration as adjusted that are different from the actual classifications of the training samples;

wherein the generated classifier is a combination of the trained sub-classifiers based on the calculated sub-classifier weights of the trained sub-classifiers.

2. The method of claim 1 wherein the generated classifier is an adaptive boosting classifier.

3. The method of claim 1 wherein the training samples are scenes of a video.

4. The method of claim 3 wherein an inter-sample relationship is time of a scene.

5. The method of claim 4 wherein the classification is whether a scene represents a commercial.

6. The method of claim 5 wherein the adjusting of the trained classifier includes changing the classification of scenes classified as not commercials to commercials when the scenes are bound by scenes classified as commercials whose difference in times is below a threshold.

7. The method of claim 1 wherein the initial weights of the training samples are set according to the following equation:

$$D_1(i) = 1/N$$

where $D_1(i)$ is the initial weight of the i-th training sample and N is number of training samples.

8. The method of claim 7 wherein the weights of the training samples are adjusted according to the following equation:

$$D_{t+1}(i) = \frac{D_t(i)}{Z_t} \times \begin{cases} e^{-\alpha_t}, & \text{if } h_t(x_i) = y_i \\ e^{\alpha_t}, & \text{if } h_t(x_i) \neq y_i \end{cases}$$

where $D_{t+1}(i)$ is the adjusted weight for the t+1-th iteration for the i-th training sample, $Z_t$ is a normalization factor, $h_t(x_i)$ is the inter-sample adjusted classification of the t-th sub-classifier for the i-th scene, $y_i$ is the actual classification of the i-th scene, and $\alpha_t$ is defined by the following equation:

$$\alpha_t = \frac{1}{2} \ln\left(\frac{1 - \varepsilon_t}{\varepsilon_t}\right)$$

where $\varepsilon_t$ is defined by the following equation:

$$\varepsilon_t = \sum_{h_t(x_i) \neq y_i} D_t(i).$$

9. The method of claim 1 where the training samples are scenes within a video and the generated classifier is used to classify scenes within a video as being a commercial or not a commercial.

10. The method of claim 9 wherein the generated classifier applies each sub-classifier to feature vectors of the scenes to generate a classification for each scene for each sub-classifier and combines the classifications for a scene based on the weight of the sub-classifier that generated the classification.

11. The method of claim 10 wherein the classifications are combined based on the following equation:

$$H(x_i) = \text{sign}\left(\sum_{t=1}^{T} \alpha_t h_t(x_i)\right)$$

where $H(x_i)$ is the combined classification for the i-th scene, $x_i$ is the feature vector for the i-th scene, T is the number of sub-classifiers, $h_t$ is the adjusted t-th sub-classifier, and $\alpha$ is represented by the following equation:

$$\alpha_t = \frac{1}{2} \ln\left(\frac{1 - \varepsilon_t}{\varepsilon_t}\right)$$

where $\varepsilon_t$ represents error of the t-th sub-classifier.

12. The method of claim 10 including adjusting the combined classifications based on a majority-rule windowing.

13. A method in a computer system with a processor and memory for classifying a sequence of sub-objects of an object, comprising:
- providing a classifier comprising sub-classifiers with a sub-classifier weight for each sub-classifier, each sub-classifier providing an initial classification of each sub-object;
- for each sub-classifier,
  - applying by the processor the sub-classifier to the sub-objects of an object to generate an initial classification for each sub-object for the sub-classifier; and
  - adjusting by the processor the initial classification of sub-objects based on the relationship between sub-objects to generate an adjusted classification for the sub-objects for the sub-classifier; and
- for each sub-object, combining by the processor the adjusted classifications for the sub-object using the sub-classifier weights of the generating sub-classifier to give a final classification for the sub-object.

14. The method of claim 13 wherein the object is a video and the sub-objects are scenes within the video and the classification indicates whether a scene is a commercial.

15. The method of claim 14 wherein the relationship between scenes is based on time between scenes and initial classification of the scenes.

16. The method of claim 15 wherein when the initial classification of two scenes is commercial and the scenes are within a certain time of each other, setting the adjusted classification of the scenes in between the two scenes to commercial.

17. The method of claim 15 including adjusting the final classifications using a majority-based windowing technique.

18. The method of claim 17 wherein the adjusting includes setting the classification of the scenes within a sequence of scenes to the classification of the majority of the scenes within the sequence.

19. A computer-readable storage medium containing instructions for controlling a computer system to generate a classifier based on training samples and a relationship between training samples, by a method comprising, for a plurality of sub-classifiers:
    training the sub-classifier based on the training samples, actual classifications of the training samples, and sample weights derived from a determined accuracy of a previously trained sub-classifier, the trained sub-classifier providing initial classifications for training samples;
    adjusting the initial classifications based on a relationship between training samples to provide an adjusted classification;
    determining accuracy of the adjusted classifications as compared to the actual classifications of the training samples;
    generating a new sample weight for each training sample based on the determined accuracy of the adjusted classification; and
    calculating a sub-classifier weight for the trained sub-classifier based on the determined accuracy of the adjusted classifications,
wherein the generated classifier is a combination of the trained sub-classifiers and calculated sub-classifier weights of the trained sub-classifiers.

20. The computer-readable storage medium of claim 19 wherein the training applies an adaptive boosting technique.

21. The computer-readable storage medium of claim 20 wherein the adjusting applies a minority-based merge.

22. The computer-readable storage medium of claim 19 wherein each sub-classifier has a weight and the generated classifier classifies based on a weighted average of the classifications of the sub-classifiers.

23. The computer-readable storage medium of claim 19 wherein the training samples are scenes of a video.

24. The computer-readable storage medium of claim 23 wherein a relationship is based on a time associated with a scene.

25. The computer-readable storage medium of claim 24 wherein the classification is whether a scene is a commercial.

26. The computer-readable storage medium of claim 25 wherein the adjusting of the trained initial classifications changes the classification of scenes classified as not commercials to commercials when the scenes are bound by scenes classified as commercials whose difference in times is below a threshold.

27. The computer-readable storage medium of claim 19 where the training samples are scenes within a video and the generated classifier is used to classify scenes within a video as being a commercial or not a commercial.

28. The computer-readable storage medium of claim 27 wherein the generated classifier applies each sub-classifier to a feature of the scenes to generate a classification for each scene for each sub-classifier and combines the classifications for a scene based on a weight associated with the sub-classifier that generated the classification.

29. A computer-readable storage medium containing instructions for controlling a computer system to generate a classifier to classify scenes of a video as commercial or not commercial using an adaptive boosting training technique, by a method comprising:
    providing a plurality of training scenes of a training video, each training scene represented by a feature vector and having an actual classification;
    assigning a current weight to each training scene;
    for a plurality of sub-classifiers,
        training the sub-classifier based on the training scenes and actual classifications of the training scenes, the trained sub-classifier to provide classifications for scenes;
        classifying the training scenes using the trained sub-classifier;
        setting the classification of the training scenes to commercial when the training scenes are in between training scenes classified as commercial and a time between the training scenes indicates that the training scenes are within a commercial;
        resetting the current weights of the training scenes based on similarity of the classifications to the actual classifications; and
        generating a weight for the sub-classifier based on similarity of the classification to the actual classification,
wherein the generated classifier is a combination of the trained sub-classifiers weighted based on the generated weights of the sub-classifiers.

30. The computer-readable storage medium of claim 29 including classifying scenes of a video by:
    initially classifying each scene using each trained sub-classifier;
    setting the classification of scenes to commercial when the scenes are in between scenes initially classified as commercial and a time between the scenes indicates that the scenes are within a commercial; and
    setting a final classification of a scene to commercial or not commercial based on the classification of a majority of the scenes within a window.

* * * * *